United States Patent [19]

Bridges et al.

[11] 4,366,057

[45] Dec. 28, 1982

[54] OIL FILTER SEAL MEMBRANE

[75] Inventors: Thomas K. Bridges; Howard Nourse, both of Fountain Valley, Calif.

[73] Assignee: Kirk Bridges, Inc.

[21] Appl. No.: 327,422

[22] Filed: Dec. 4, 1981

[51] Int. Cl.$^3$ ............................................. B01D 27/00
[52] U.S. Cl. ................................. 210/437; 210/440; 210/450; 210/497.1
[58] Field of Search ............... 210/232, 238, 346, 347, 210/440, 443, 444, 445, 450, 487, 497.1, 168

[56] References Cited

U.S. PATENT DOCUMENTS 3,887,467  6/1975  Johnson ............................... 210/232
4,017,400  4/1977  Schade .................................. 210/443

*Primary Examiner*—Ernest G. Therkorn
*Attorney, Agent, or Firm*—Richard H. Zaitlen

[57] ABSTRACT

In an axial flow filtering apparatus for filtering oil, having one or more filter elements of the wound tissue type, wherein the oil passes through the filter elements to a collection channel, and then to an outlet port, the improvement comprising a flexible, non-porous membrane, configured to be disposed in a sealing relationship about the circumference of the filter elements, and completely overlapping the collection channel, thereby preventing oil from entering the collection channel from the exterior of the filter elements.

12 Claims, 4 Drawing Figures

OIL FILTER SEAL MEMBRANE

BACKGROUND OF THE INVENTION

1. Field of the Invention

This invention relates to filters for fluids such as hydraulic oil, transformer oil and lubricating oil, and more particularly to a sealing membrane for use therewith.

2. Prior Art

Oil filters for removing dirt, common residue, and other materials from oil are well known in the art. Such filters are usually packaged either as disposable canisters or as replaceable cartridges. They are generally provided with one or more filter elements which may be of a wound tissue type.

Inflow and outflow connections are provided such that oil entering the canister will flow axially through a filter element, through the interstices between the layers of filter tissue. The dirt and sludge will thus be removed from the oil by the filter tissue. Where there is a single filter element, the oil will flow from one end of the canister to the other, through one end of the filter element, then out the other end of the filter element. The oil is then directed to a central tube which is connected to the outflow connection.

Where dual filter elements are used, the oil will flow from both ends of the canister through the filter elements to a center passageway where the oil is directed to the center tube.

In both single and double filter element devices, the ends of the filter elements adjacent the collection passages are susceptible to leakage due to the pressures involved. The pressure drop across the filter may be in excess of 90 p.s.i., resulting in substantial compressive forces being exerted hydraulically on the filter tissue. These forces tend to compress and distort the filter element, particularly at the return or exhaust ends thereof.

One solution which has heretofore been used has been to provide an interlocking annular seal which is essentially a ring inserted into the filter element a few layers inwardly of the perimeter of the filter element. A more complete description of such a sealing device as used with an oil filter can be found in U.S. Pat. No. 4,017,400 to Schade. However, it has been discovered that even with such an annular seal, the great hydraulic forces within the filter still result in deformation of the filter element. This causes flow channels to form which allow fluid to flow around the annular seal and thus bypass entirely the filter element. The result is that a significant amount of unfiltered oil is recirculated without removal of much of the contaminants.

BRIEF SUMMARY OF THE INVENTION

It is therefore an object of this invention to provide a filter element in an oil filter which enables superior single pass efficiency to be achieved.

The membrane seal of the present invention is designed to be used with any conventional oil filter such as are well known in the art. Such oil filters generally comprise a circular base with a core tube projecting centrally therefrom and a cylindrical casing which has one open end. The open end of the casing is attached to the base in a sealed relationship.

Disposed within the casing are one or more filter elements. Each filter element comprises layered windings of fiberous sheet tissue with a wound diameter slightly less than the inside diameter of the casing. The core tube extends upwardly through the center of the filter element.

In a single element filter, the filter is designed so that dirty oil is directed into one end of the filter element, and is forced axially through the filter tissue to the opposite end of the filter element. Then, it passes through a screen to a collection channel through which it is directed to a core tube. The core tube then carries the filtered oil to an exit port.

In a dual element device, the two elements are placed end to end within the casing, separated by a collection channel. The dirty oil is directed into the opposing ends of the two elements and is forced through the filter tissue of the two elements to the center collection channel. It is then carried to a core tube through which it passes to an exit port.

It has been recognized that due to the high pressures involved, the edges of the filter element would frequently be deformed so that channels would form through the tissue allowing unfiltered oil to pass directly into the collection channel. Thus some of the oil would pass through the oil filter without being actually filtered with the result that dirty oil would be recycled through the system.

One solution to the problem has been to provide an annular seal ring which is inserted between layers of the filter element a few layers inwardly of the perimeter thereof and spanning the collection channel. (See U.S. Pat. No. 4,017,400.) However, it has been discovered that under the high pressures experienced in many situations, the filter element would continue to deform. Such deformation may be large enough to permit channels to be formed around the annular ring seals. Thus, some dirty oil will gain access to the collection channel and will contaminate the filtered oil.

Under the present invention, there is provided a flexible membrane about the circumference of the filter element which covers the area adjacent to the collection channel. For a single element filter, the membrane will be disposed at one end of the element and will overlap in part, both the element and an adjacent channel forming member as well as completely overlapping the collection channel therebetween.

In a dual element device, the collection channel is disposed between the two elements. The membrane seal, according to the present invention partially overlaps each element and completely overlaps the collection channel therebetween. In either the single or dual filter element embodiment, the need for an annular seal ring is obviated.

The membrane seal of the present invention may be made of any flexible non-porous material compatible with the fluid being filtered such as neoprene. Preferably, the material is sufficiently elastic to maintain a positive seal.

The novel features which are believed to be characteristic of the present invention, both as to its configuration and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

DETAILED DESCRIPTION OF THE INVENTION

Figure 1:
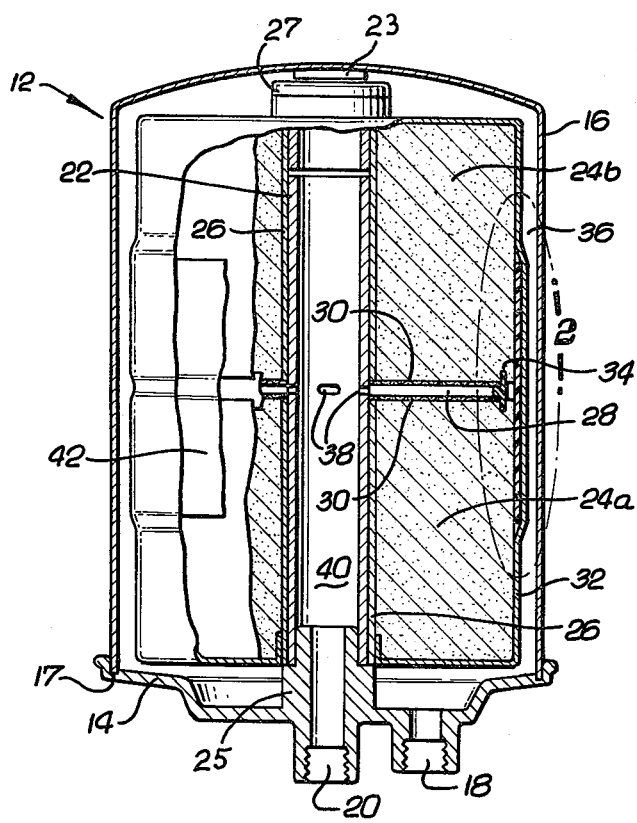
FIG. 1 is a partially cut away elevational view of the membrane seal device as used with a dual element oil filter.
Figure 2:
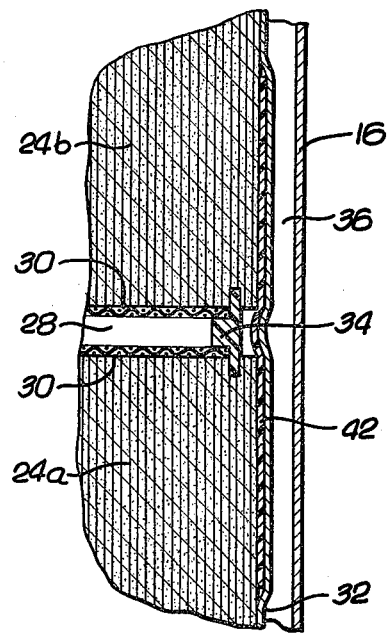
FIG. 2 is a detailed view of a portion of the side of the oil filter of FIG. 1.

Referring first to FIGS. 1 and 2, there is shown the membrane seal device of the present invention as used with a disposable dual element oil filter 12.

The dual element oil filter 12 generally comprises a base 14 and a cylindrical casing 16. The cylindrical casing 16 has an open end 17 which is secured in a sealed relationship to the base 14.

The base 14 has an inlet port 18 and an outlet port 20. A core tube 22 extends along the axis of the cylindrical casing 16 and is in fluid communication with the outlet port 20. Tube 22 is sealed at one end by cap 27.

In the dual element oil filter 12 there are provided two filter elements 24. Each filter element 24 comprises layered windings of fibrous sheet tissue with a wound diameter slightly less than the inside diameter of the cylindrical casing 16. The windings of the filter elements 24 are wound about a web core 26 which may disposed over the core tube 22.

The two filter elements 24 are placed end to end within the casing 16 in a coaxial relationship. Between the filter elements 24 is disposed a center collection channel 28. In one embodiment shown in FIG. 2, the sides of the collection channel 28 are formed by a pair of screens 30 which further act to insure an exhaust passage for the cleaned oil as hereinbelow described. Disposed about the outer surface of the filter elements 24 is a knit sock 32. Sock 32 can be made from a variety of materials such as paper or cloth and may even be metal. Sock 32 helps protect the filter material 24 during handling. In the environment shown in FIG. 1, i.e., a disposable base 14 and casing 16 joined together, sock 32 may be omitted. An annular ring 34 is disposed inwardly a few layers from the perimeter of the filter elements 24 and extends into the adjacent ends of the filter elements 24 between layers of filter tissue. This ring 34 provides a means for spacing elements 24 apart and for preventing external pressures from collapsing the filters 24.

In operation, oil enters the inlet port 18 and is directed into one end of the first filter element 24a and is also directed around the perimeter of the filter elements 24 through a space 36 to the opposing end of the second filter element 24b. All oil is then forced through the two ends of the filter elements 24 and axially through the windings of the filter elements 24 towards the center collection channel 28. In one embodiment, the filtered oil passes through the screens 30 into the collection channel 28 where it is then directed through holes 38 into the core tube 22. It then passes through the space 40 in the core tube 22 and out the outlet port 20.

In practice, it has been found that under the high pressures frequently found in such oil filters, the material of the filter element 24 would be deformed about the area of the ring 34, creating channels which allow the oil to bypass the filter elements 24 and go directly into the collection channel 28. This causes the filtered oil to be contaminated with unfiltered oil to the detriment of the equipment with which the oil filter is being used. The present invention overcomes this problem by the use of a flexible sealing membrane 42 which is disposed about the filter elements 24, partially overlapping each filter element 24 and completely overlapping the collection channel 28. The sealing membrane 42 comprises a flexible non-porous material such as neoprene which is sufficiently elastic to maintain a positive seal. Depression 23 and shoulder 25 position filter element 24 to prevent movement under pressure so as to form a seal about port 20 thus precluding oil from leaking into tube 22 adjacent base 14.

By using the sealing membrane 42 of the present invention, even under high pressures, no channels will be created which allow oil to pass directly into the collection channel 28 from the space 36 between the filter elements 24 and the casing 16. Even if the filter elements 24 are deformed, the flexible material of the sealing membrane 42 will deform along with the filter element 24, thus maintaining a seal between the filter element 24 and the collection channel 28.

Figure 2A:
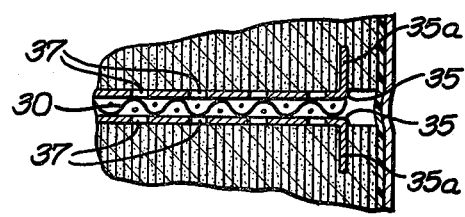
FIG. 2A is a second embodiment of the means used to separate the filter elements.

In a second embodiment shown in FIG. 2a, the ring 34 has been omitted. In this embodiment, metal plates 35 are disposed adjacent the ends of the filters 24 such that flanged portions 35a of plates 35 are disposed inwardly a few layers from the perimeter of the filters 24. The layers of paper between portions 35a and the periphery of the element 24 protects against accidental rupture of the membrane 42 in most situations. Plates 35 have been found to be an effective means of controlling the inward pressures from collapsing the wrapping used to make the filter elements. To maintain channel 28, either or both of the plates 35 can include a raised dimple. Alternatively, a wire screen 30 can be used. To insure good flow through plates 35, a series of openings 37 are provided.

Figure 3:
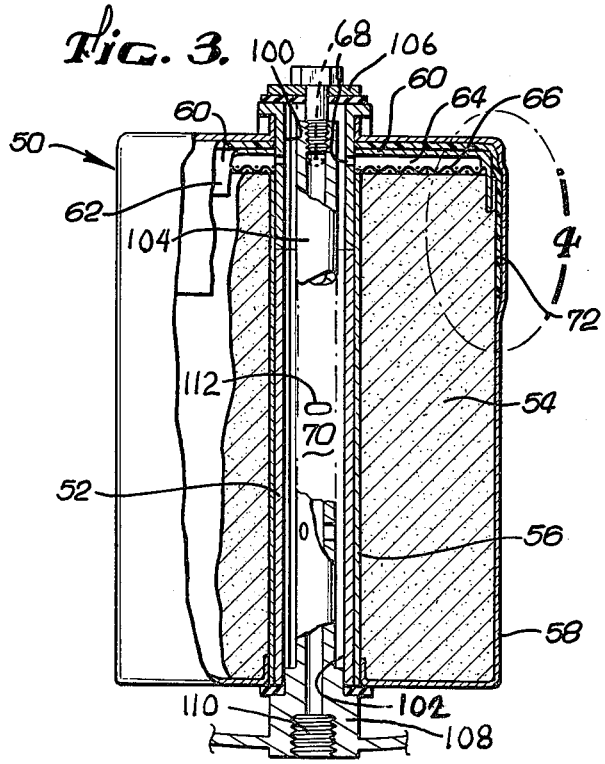
FIG. 3 is a partially cut away elevational view of the membrane seal device of the present invention as used with a single element oil filter.
Figure 4:
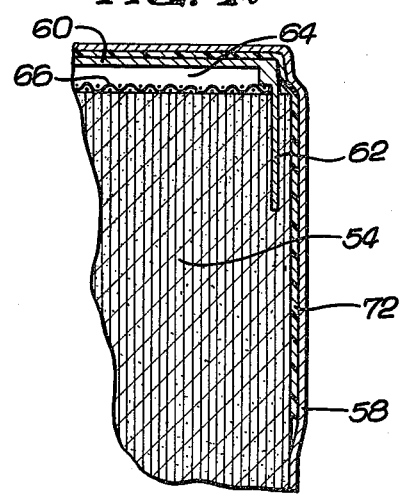
FIG. 4 is a detailed view of a corner section of the oil filter of FIG. 3.

The membrane seal device of the present invention may also be used with a single element oil filter 50 as is shown in FIGS. 3 and 4. Such a single element oil filter 50 also comprises a base and a cylindrical casing similar to those discussed above, but which are not shown in FIGS. 3 and 4. There is a core tube 52 disposed along the axis of the casing. The filter element 54 is similar to those described above as being wound about a web core 56 and disposed over the core tube 52. There is also a knit sock 58 disposed over the surface of the filter element 54.

At one end of the filter element 54 is a plate 60. The plate 60 has a depending rim 62 which fits snugly into the end of the filter element 54 similar to plate 35. There is a space between the end of the filter element 54 and the retainer pan 60 which comprises the collection channel 64. A screen 66 is disposed at the end of the filter element 54 in the collection channel 64.

In operation, oil is forced into the end of the filter element 54 opposite the collection channel 64. The oil then travels axially through the filter element 54, then through the screen 66 and along the collection channel 64. The oil is directed inwardly through holes 68 in the core tube 52, and then through space 70 in the core tube 52 to the outlet port just as with the dual element oil filter 12 described above.

The oil also is present to a certain degree about the sides of the filter element 54 in the space between the filter element 54 and the casing. It has been discovered, that due to the high pressure under which the oil is forced into the oil filter 50, the tissue at the end of the filter element 54 adjacent the depending rim 62 of the retainer pan 60 is frequently deformed. This allows the oil to flow past the depending rim 62 into collection channel 64 without passing through the filter element 54. Thus, unfiltered oil mixes with the filtered oil, contaminating the entire oil supply.

Under the present invention, there is provided sealing membrane 72. Sealing membrane 72 overlaps a portion of the filter element 54 and the plate 60 to seal the interface between the depending rim 62 and the filter element 54. Thus, sealing membrane 72 of the present invention flexes along with the filter element 54 whenever the filter element 54 is deformed due to the high oil pressure. A seal is maintained between the outer surface of the filter element 54 and the depending rim 62 of the retainer pan 60.

Thus, it can be seen that the sealing membrane of the present invention may be used with any conventional single or multiple element oil filter to effectively seal the collection channel from access by oil from the exterior of the filter element without having the oil first pass through the filter element. The membrane seal device of the present invention may easily be adapted for use with most existing conventional oil filters. The filter shown in FIGS. 3 and 4 can be used with a cannister which is reusable. In such a situation, end 100 and 102 are sealed by a tension pipe 104 which would extend along core 70 and closes off these ends by any well known sealing element 106, 108. The tension pipe 104 would have an internal passageway 110 and openings 112 in flow communication with core 70 thus permitting the cleaned oil to exit.

While a wide variety of the materials, shapes and other configurations can be used in this invention, it should be understood that changes can be made without departing from the spirit or scope thereof. For example the filter shown in FIG. 1 can be combined with the filter shown in FIG. 3. Further, sock 58 can be sandwiched between elements 52 and 56 for added integrity.

This invention, therefore, is not to be limited to the specific embodiments discussed and illustrated therein.

I claim:

1. In an axial flow filtering apparatus for filtering fluids having a centrally located flow means, an outlet port for passage of filtered fluid from said flow means out of said apparatus, at least one filter element comprising wound layers of tissue, and a channel extending radially outward from said flow means wherein said fluid passes through said filter element to said channel where it is conducted to said flow means and then to said outlet port, the improvement comprising:
    a flexible, non-porous membrane configured to be disposed in a sealing relationship about the circumference of said filter element such that said membrane partially overlaps said filter element and completely overlaps said channel, thereby preventing said fluid from entering said channel from a point outside said filter element, without first passing through at least one filter element.

2. The apparatus of claim 1 wherein said membrane comprises an elastic material.

3. The apparatus of claim 1 wherein said membrane comprises neoprene.

4. The apparatus of claim 1 wherein said flow means comprises a cylindrical tube disposed along the axis of said apparatus.

5. The apparatus of claim 1 wherein said apparatus has two filter elements joined together in an end-to-end configuration, thereby defining said channel.

6. The apparatus of claim 5 wherein said membrane completely overlaps said channel and partially overlaps the ends of each said filter element adjacent said channel.

7. The apparatus of claim 5, further comprising opposed, porous plates defining said channel.

8. The apparatus of claim 7, further comprising a screen disposed between said plates.

9. The apparatus of claim 7, wherein said plates are embedded into said filter elements.

10. The apparatus of claim 7 further including means for retaining said plates in a spaced apart configuration.

11. The apparatus of claim 1 including a plate disposed between said membrane and said filter adjacent said channel.

12. The apparatus of claim 11 wherein a screen is disposed in said flow channel.

* * * * *